United States Patent
Oura et al.

(10) Patent No.: US 12,095,080 B2
(45) Date of Patent: Sep. 17, 2024

(54) SLURRY, ALL SOLID STATE BATTERY AND METHOD FOR PRODUCING ALL SOLID STATE BATTERY

(71) Applicant: TOYOTA JIDOSHA KABUSHIKI KAISHA, Toyota (JP)

(72) Inventors: Kei Oura, Toyota (JP); Masaki Adachi, Mishirna (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/491,024

(22) Filed: Oct. 20, 2023

(65) Prior Publication Data

US 2024/0047658 A1 Feb. 8, 2024

Related U.S. Application Data

(62) Division of application No. 17/079,866, filed on Oct. 26, 2020, now Pat. No. 11,837,721.

(30) Foreign Application Priority Data

Oct. 28, 2019 (JP) .................................. 2019-195270

(51) Int. Cl.
*H01M 4/36* (2006.01)
*H01M 4/62* (2006.01)
(Continued)

(52) U.S. Cl.
CPC ........... *H01M 4/366* (2013.01); *H01M 4/623* (2013.01); *H01M 10/0525* (2013.01);
(Continued)

(58) Field of Classification Search
CPC .. H01M 4/366; H01M 4/623; H01M 10/0525; H01M 10/0585;
(Continued)

(56) References Cited

U.S. PATENT DOCUMENTS

| | | | |
|---|---|---|---|
| 2013/0142943 A1 | 6/2013 | Kubo et al. | |
| 2014/0004257 A1 | 1/2014 | Kubo et al. | |

(Continued)

FOREIGN PATENT DOCUMENTS

| | | |
|---|---|---|
| CN | 107768714 B | 4/2022 |
| JP | 2012212652 A | 11/2012 |

(Continued)

OTHER PUBLICATIONS

Choi, Seon-Joo, et al. "LiI-doped sulfide solid electrolyte: enabling a high-capacity slurry-cast electrode by low-temperature post-sintering for practical all-solid-state lithium batteries." ACS applied materials & interfaces 10.37 (2018): 31404-31412. (Year: 2018).

(Continued)

*Primary Examiner* — Stewart A Fraser (74) *Attorney, Agent, or Firm* — Dinsmore & Shohl LLP (57) ABSTRACT

A main object of the present disclosure is to provide a slurry capable of forming an all solid state battery with low ion resistivity. The present disclosure achieves the object by providing a slurry comprising a sulfide solid electrolyte and a solvent, and the solvent includes a first solvent and a second solvent, a boiling point of the first solvent is 80° C. or more and less than a crystallization temperature of the sulfide solid electrolyte, the first solvent is acyclic ether based solvent, acyclic ester based solvent, or acyclic ketone based solvent, and a boiling point of the second solvent is the crystallization temperature of the sulfide solid electrolyte or more.

1 Claim, 1 Drawing Sheet

(51) Int. Cl.
*H01M 10/0525* (2010.01)
*H01M 10/0585* (2010.01)

(52) U.S. Cl.
CPC ............... *H01M 10/0585* (2013.01); *H01M 2300/0028* (2013.01); *H01M 2300/0068* (2013.01)

(58) Field of Classification Search
CPC . H01M 2300/0028; H01M 2300/0068; H01M 4/525; H01M 4/587; H01M 4/62; H01M 10/0562
See application file for complete search history.

(56) References Cited

U.S. PATENT DOCUMENTS

| | | |
|---|---|---|
| 2016/0322639 A1 | 11/2016 | Jeong |
| 2018/0053932 A1 | 2/2018 | Jeong |
| 2019/0074544 A1 | 3/2019 | Senga |
| 2019/0148733 A1 | 5/2019 | Oura |
| 2020/0328451 A1 | 10/2020 | Suganuma et al. |

FOREIGN PATENT DOCUMENTS

| | | |
|---|---|---|
| JP | 2013118143 A | 6/2013 |
| JP | 2018170072 A | 11/2018 |
| JP | 2020173992 A | 4/2019 |
| JP | 2019091632 A | 6/2019 |
| KR | 20180772944 A | 7/2018 |

OTHER PUBLICATIONS

English machine translation of Doh et al. (KR 20180772944 A) (Year: 2018).

Fan, Lizhen, Ce-Wen Nan, and Shujin Zhao. "Effect of modified SiO2 on the properties of PEO-based polymer electrolytes." Solid State Ionics 164.1-2 (2003): 81-86. (Year: 2003).

SLURRY, ALL SOLID STATE BATTERY AND METHOD FOR PRODUCING ALL SOLID STATE BATTERY

CROSS-REFERENCE TO RELATED APPLICATIONS

This application is a Divisional application of U.S. application Ser. No. 17/079,866, filed on Oct. 26, 2020, which claims priority to Japanese Patent Application No. 2019-195270 filed on Oct. 28, 2019, the entire disclosures of which are hereby incorporated by reference.

TECHNICAL FIELD

The present disclosure relates to a slurry, an all solid state battery and a method for producing an all solid state battery.

BACKGROUND ART

In accordance with a rapid spread of information relevant apparatuses and communication apparatuses such as a personal computer, a video camera and a portable telephone in recent years, the development of a battery to be used as a power source thereof has been emphasized. The development of a high-output and high-capacity battery for an electric automobile or a hybrid automobile has been advanced also in the automobile industry. Currently, among various kinds of batteries, lithium ion secondary batteries are attracting attention in terms of high energy density.

Since a liquid electrolyte containing a flammable organic solvent is used for the lithium ion secondary batteries currently available in the market, installation of a safety device for suppressing temperature increase upon short circuit and a structure for inhibiting the short circuit are required. In contrast, an all solid state lithium ion secondary battery, wherein the battery is all solidified by using a solid electrolyte layer instead of the liquid electrolyte, does not include the flammable organic solvent in the battery. Therefore, the simplification of the safety device may be more easily achieved, and thought to be superior in manufacturing cost and productivity.

Patent Literature 1 discloses an all solid state battery produced by using an electrode composition in a slurry state including a sulfide solid electrolyte and a polar solvent as a dispersion medium. As the dispersion medium, triethyl amine (tertiary amine), cyclopentyl methyl ether (ether), etc. are listed.

Patent Literature 2 discloses that a method for producing an all solid state battery electrode comprises a mixing and kneading step of producing an electrode composition in a slurry state by mixing and kneading an active material, a solid electrolyte, a binder and a solvent, a coating step of coating the produced electrode composition in a slurry state, and a drying step of drying the coated electrode composition in a slurry state. The solvent includes a good solvent for the binder and a poor solvent for the binder, and Patent Literature 2 discloses to use heptane as the good solvent for the binder and butyl butyrate as the poor solvent for the binder.

Patent Literature 3 discloses that an electrolyte-containing layer is formed in a method for producing an all solid state battery, by using a slurry including a sulfide solid electrolyte, a binder, a ketone solvent, and a saturated hydrocarbon solvent. Patent Literature 3 also discloses that the ketone solvent remains in the electrolyte-containing layer. Also, Patent Literature 4 discloses that a composite solid electrolyte including two kinds of specific solid electrolytes.

CITATION LIST

Patent Literatures

Patent Literature 1: Japanese Patent Application Laid-Open (JP-A) No. 2012-212652
Patent Literature 2: JP-A 2013-118143
Patent Literature 3: JP-A 2019-091632
Patent Literature 4: JP-A 2018-170072

SUMMARY OF DISCLOSURE

Technical Problem

In Patent Literature 1 and Patent Literature 2, for example, a drying treatment for removing the solvent (dispersion medium) is carried out after the electrode composition in a slurry state is coated. Also, although the electrode layer after drying is pressed, the ion resistivity of the electrode layer tends to be high since the interface resistance (friction resistance) between the particles included in the electrode layer during the press is high. Further, not only the electrode layer but also when forming a solid electrolyte layer using the slurry, the ion resistivity of the solid electrolyte layer tends to be high.

The present disclosure has been made in view of the above circumstances, and a main object is to provide a slurry capable of forming an all solid state battery with low ion resistivity.

Solution to Problem

In order to achieve the object, the present disclosure provides a slurry comprising a sulfide solid electrolyte and a solvent, and the solvent includes a first solvent and a second solvent, a boiling point of the first solvent is 80° C. or more and less than a crystallization temperature of the sulfide solid electrolyte, the first solvent is acyclic ether based solvent, acyclic ester based solvent, or acyclic ketone based solvent, and a boiling point of the second solvent is the crystallization temperature of the sulfide solid electrolyte or more.

According to the present disclosure, by including the second solvent with the boiling point higher than the first solvent, in addition to a specific first solvent, a slurry capable of forming an all solid state battery with low ion resistivity may be obtained.

In the disclosure, the boiling point of the first solvent may be less than 200° C.

In the disclosure, the boiling point of the second solvent may be 200° C. or more.

The present disclosure also provides a slurry comprising a sulfide solid electrolyte and a solvent, and the solvent includes a first solvent and a second solvent, a boiling point of the first solvent is 80° C. or more and less than 200° C., and the first solvent is acyclic ether based solvent, acyclic ester based solvent, or acyclic ketone based solvent, and a boiling point of the second solvent is 200° C. or more.

According to the present disclosure, by including the second solvent with the boiling point higher than the first solvent, in addition to a specific first solvent, a slurry capable of forming an all solid state battery with low ion resistivity may be obtained.

In the disclosure, a proportion of the second solvent to 100 weight parts of solid content of the slurry may be 0.05 weight parts or more.

In the disclosure, the slurry may further comprise a binder.

In the disclosure, the slurry may further comprise an active material.

The present disclosure also provides an all solid state battery comprising a cathode active material layer, a solid electrolyte layer, and an anode active material layer, and at least one layer of the cathode active material layer, the solid electrolyte layer, and the anode active material layer is a solid electrolyte-containing layer including a sulfide solid electrolyte, the solid electrolyte-containing layer includes a first solvent and a second solvent as solvents, a boiling point of the first solvent is 80° C. or more and less than a crystallization temperature of the sulfide solid electrolyte, the first solvent is acyclic ether based solvent, acyclic ester based solvent, or acyclic ketone based solvent, a boiling point of the second solvent is a crystallization temperature of the sulfide solid electrolyte or more, and a content proportion of the first solvent in the solid electrolyte-containing layer is 0.01 weight % or more.

According to the present disclosure, since the solid electrolyte-containing layer incudes a predetermined amount of a specific solvent, an all solid state battery with low ion resistivity may be obtained.

In the disclosure, a content proportion of the second solvent in the solid electrolyte-containing layer may be 0.05 weight % or more.

In the disclosure, a content proportion of the solvents in the solid electrolyte-containing layer may be 0.25 weight % or more.

The present disclosure also provides a method for producing an all solid state battery, the method comprising: a coating step of forming a coating layer by coating a substrate with the above described slurry, a drying step of forming a dried coating layer by drying the coating layer, and a pressing step of forming a solid electrolyte-containing layer by pressing the dried coating layer, and a drying condition in the drying step is adjusted so as a content proportion of the first solvent in the solid electrolyte-containing layer is 0.01 weight % or more.

According to the present disclosure, by adjusting the drying condition in the drying step so as the solid electrolyte-containing layer includes a predetermined amount of a specific solvent, an all solid state battery with low ion resistivity may be obtained.

Advantageous Effects of Disclosure

According to the present disclosure, a slurry capable of forming an all solid state battery with low ion resistivity may be provided.

DESCRIPTION OF EMBODIMENTS

A slurry, an all solid state battery, and a method for producing an all solid state battery in the present disclosure are hereinafter described. Incidentally, the embodiments described below are exemplification, and a slurry, an all solid state battery, and a method for producing an all solid state battery in the present disclosure are not limited to the embodiments described below.

A. Slurry

The slurry in the present disclosure is a slurry comprising a sulfide solid electrolyte and a solvent, and the solvent includes a first solvent and a second solvent, a boiling point of the first solvent is 80° C. or more and less than a crystallization temperature of the sulfide solid electrolyte, the first solvent is acyclic ether based solvent, acyclic ester based solvent, or acyclic ketone based solvent, and a boiling point of the second solvent is the crystallization temperature of the sulfide solid electrolyte or more.

According to the present disclosure, by including the second solvent with the boiling point higher than the first solvent, in addition to a specific first solvent, a slurry capable of forming an all solid state battery with low ion resistivity may be obtained.

Here, when the below described solid electrolyte-containing layer is formed by using a slurry, a coating layer is usually formed by coating the slurry, a dried coating layer is formed by drying the obtained coating layer, and a solid electrolyte-containing layer is formed by pressing the obtained dried coating layer. Since the slurry in the present disclosure includes the second solvent with high boiling point as a solvent, there is an advantage that the solvent is easily left remained in the dried coating layer in a positive manner, when the coating layer is dried. By leaving the solvent remained in a positive manner, the interface resistance (friction resistance) between the particles included in the dried coating layer may be reduced during the pressing. In other words, the sliding property between the particles included in the dried coating layer may be improved. Thereby, a dense layer may be formed, and an all solid state battery with low ion resistivity may be obtained.

A solvent with high boiling point as the second solvent is usually not used for a slurry since the evaporation rate at drying is low. A solvent with high evaporation rate at drying, in other words, a solvent with low boiling point is usually used for a slurry, in light of the manufacturing efficiency. In contrast to this, in embodiments of the present disclosure, a suitable manufacturing efficiency may be maintained by using the first solvent with low boiling point, whereas a slurry wherein the solvent is easily left remained in the dried coating layer in a positive manner, may be obtained by using the second solvent with the boiling point higher than the first solvent.

As described above, in Patent Literatures 1 and 2, for example, after coating the electrode composition in a slurry state, a drying treatment is carried out to remove the solvent (dispersion medium). Since the solvent included in the electrode composition in a slurry state does not usually contribute to the ion conductivity, the solvent is completely removed by sufficiently drying. Therefore, Patent Literatures 1 and 2 neither describe nor suggest to leave the solvent remained in a positive manner. Meanwhile, Patent Literature 3 describes that ketone solvent is left remained in the electrolyte-containing layer. However, Patent Literature 3 suggests the possibility of a side reaction due to the remained solvent amount, and Patent Literature 3 neither describe nor suggests to leave the solvent remained in a positive manner.

1. Solvent

The slurry in the present disclosure includes a solvent. The solvent in the present disclosure refers to a solvent in a broad sense, and what is called a dispersion medium is included. Also, the solvent in the present disclosure includes a first solvent and a second solvent.

(1) First Solvent

The boiling point of the first solvent in the present disclosure is 80° C. or more and less than a crystallization temperature of the sulfide solid electrolyte, and the first solvent is acyclic ether based solvent, acyclic ester based solvent, or acyclic ketone based solvent.

The boiling point of the first solvent in the present disclosure is usually 80° C. or more. When the boiling point of the first solvent is too low, the evaporation rate of the first solvent is high so that the solid content of the slurry is easily agglutinated. The boiling point of the first solvent may be 90° C. or more, and may be 100° C. or more.

The boiling point of the first solvent is usually less than the crystallization temperature of the sulfide solid electrolyte. When the boiling point of the first solvent is the crystallization temperature of the sulfide solid electrolyte or more, the sulfide solid electrolyte will be exposed to high temperature for a long time, in order to remove the first solvent. As the result, not only the operational efficiency is deteriorated, but also the sulfide solid electrolyte is possibly deteriorated. The boiling point of the first solvent may be lower than the crystallization temperature of the sulfide solid electrolyte by 5° C. or more, may be lower by 10° C. or more, and may be lower by 20° C. or more. The boiling point of the first solvent is, for example, less than 200° C., may be 170° C. or less, and may be 130° C. or less.

The molecular weight of the first solvent is, for example, 80 or more, and may be 100 or more. Meanwhile, the molecular weight of the first solvent is, for example, 150 or less. Also, the viscosity of the first solvent at 25° C. is, for example, 0.1 mPa·s or more and 2 mPa·s or less.

Also, the first solvent is acyclic ether based solvent, acyclic ester based solvent, or acyclic ketone based solvent. The first solvent may be a solvent of one kind, and may be solvents of two kinds or more. Also, the acyclic ether based solvent refers to a solvent whose ether group (—O—) does not constitute a ring structure such as an aromatic ring. Since the ether group of tetrahydrofuran, for example, constitutes a ring structure such as an aromatic ring, it corresponds to a cyclic ether based solvent. Similarly, the acyclic ester based solvent and the acyclic ketone based solvent refer to solvents whose ester group (—CO—O—) and ketone group (—CO—) do not constitute a ring structure such as an aromatic ring, respectively.

Since the reactivity of the lone-pair electrons in an oxygen element is high, the cyclic ether based solvent such as tetrahydrofuran is likely to be reacted with the sulfide solid electrolyte. In contrast to this, the acyclic ether based solvent is not likely to be reacted with the sulfide solid electrolyte since the reactivity of the lone-pair electrons in an oxygen element is low. Similarly, the acyclic ester based solvent and the acyclic ketone based solvent are not likely to be reacted with the sulfide solid electrolyte.

The acyclic ether based solvent is not likely to be reacted with the sulfide solid electrolyte since it includes an oxygen atom with low reactivity. In embodiments, the ether based solvent may be, for example, represented by $R^1$—O—$R^2$ ($R^1$ and $R^2$ are independently a hydrocarbon group or an ether group with carbon number of 2 or more and 6 or less, respectively). Examples of the ether based solvent may include diethylene glycol diethyl ether, cyclopentyl methyl ether, dibutyl ether, dipentyl ether, and anisole.

Similar to the acyclic ether based solvent, the acyclic ester based solvent is not likely to be reacted with the sulfide solid electrolyte also, since it includes an oxygen atom with low reactivity. In embodiments, the acyclic ester based solvent may be, for example, represented by $R^3$—CO—O—$R^4$ ($R^3$ and $R^4$ are independently a hydrocarbon group with contained carbon number of 2 or more and 4 or less, respectively). Examples of the acyclic ester based solvent may include ethyl butyrate, butyl butyrate, and 2-methyl butyl butyrate.

The acyclic ketone based solvent is not likely to be reacted with the sulfide solid electrolyte because of relatively low polarity. In embodiments, the acyclic ketone based solvent may be, for example, represented by $R^5$—CO—$R^6$ ($R^5$ and $R^6$ are independently a hydrocarbon group with included carbon number of 2 or more and 4 or less, respectively). Examples of the acyclic ketone based solvent may include methyl ethyl ketone, diethyl ketone, methyl propyl ketone, methyl isobutyl ketone, dibutyl ketone, and diisobutyl ketone.

Also, when a saturated hydrocarbon based solvent is used, for example, the solid content (particularly sulfide solid electrolyte) having polarity is agglutinated so that the dispersibility is lowered, since the polarity of the saturated hydrocarbon based solvent is low. Thereby, the interface resistance is increased, and the ion resistivity may be higher. In contrast to this, the acyclic ether based solvent, the acyclic ester based solvent, and the acyclic ketone based solvent are able to prevent the agglutination of the solid content because of the higher polarity than the saturated hydrocarbon based solvent.

(2) Second Solvent

The boiling point of the second solvent in the present disclosure is usually the crystallization temperature of the sulfide solid electrolyte or more. Since the boiling point of the second solvent is the crystallization temperature of the sulfide solid electrolyte or more, a slurry wherein the solvent is easily left remained in the dried coating layer in a positive manner, may be obtained.

When the first solvent is left remained in the dried coating layer by using only the above described first solvent as the solvent of the slurry, for example, since the evaporation rate of the first solvent is high, the adjustment of the remaining solvent amount may be difficult, and the solid content of the slurry may be easily agglutinated. Meanwhile, when the second solvent is left remained in the dried coating layer by using only the above described second solvent as the solvent of the slurry, for example, since the evaporation rate of the second solvent is low, the sulfide solid electrolyte will be exposed to high temperature for a long time, in order to remove the second solvent. As the result, not only the operational efficiency is deteriorated, but also the sulfide solid electrolyte may be deteriorated. In contrast to this, in embodiments of the present disclosure, a suitable manufacturing efficiency may be maintained by using the first solvent with low boiling point. Furthermore, a slurry wherein the solvent is easily left remained in the dried coating layer in a positive manner, may be obtained by using the second solvent with the boiling point higher than the first solvent.

The boiling point of the second solvent may be higher than the crystallization temperature of the sulfide solid electrolyte by 5° C. or more, may be higher by 10° C. or more, and may be higher by 20° C. or more. The boiling point of the second solvent is, for example, 200° C. or more, may be 220° C. or more, and may be 240° C. or more. Meanwhile, the boiling point of the second solvent is, for example, 350° C. or less. The difference between the boiling points of the second solvent and the first solvent is, for example, 40° C. or more, may be 60° C. or more, and may be 80° C. or more.

In embodiments, the molecular weight of the second solvent may be larger than the molecular weight of the first solvent. The molecular weight of the second solvent is, for example, 120 or more, may be 160 or more, and may be 200 or more. Generally, as the molecular weight increases, the boiling point of the solvent is higher. Also, as the molecular weight increases, the reactivity between the solvent and the sulfide solid electrolyte is decreased. In embodiments, the viscosity of the second solvent may be higher than the viscosity of the first solvent. Also, the viscosity of the second solvent at 25° C. is, for example, 1 mPa·s or more, may be 5 mPa·s or more, and may be 10 mPa·s or more. Generally, as the molecular weight increases, the viscosity tends to be increased.

Examples of the second solvent may include a ketone based solvent, glycol ether based solvent, ester based solvent, fatty acid ester based solvent, hydrocarbon based solvent, alcohol based solvent, sulfoxide based solvent, sulfone based solvent, amine based solvent, amide based solvent, oil based solvent, anion based surfactant, and non-ion based surfactant. The second solvent may be a solvent of one kind, and may be solvents of two kinds or more.

Examples of the ketone based solvent may include acetophenone, isophorone, and phorone. Example of the glycol ether based solvent may include triethylene glycol monomethyl ether, and decaethylene glycol monomethyl ether. Example of the ester based solvent may include 3-hydroxy-2,2,4-trimethylpentyl isobutyrate, benzyl acetate, isopentyl butyrate, γ-butyrolactone, and butyl lactate. Examples of the fatty acid ester based solvent may include polyethylene glycol monolaurate.

Examples of the hydrocarbon based solvent may include n-dodecane, tetralin, and decahydronaphthalene. Examples of the alcohol based solvent may include 1-nonanol, and 2-ethyl-1-hexanol. Examples of the sulfoxide based solvent may include dimethylsulfoxide. Examples of the sulfone based solvent may include sulfolane. Examples of the amine based solvent may include o-toluidine, m-toluidine, and p-toluidine. Examples of the amide based solvent may include N,N-dimethylacetamide, and N-methyl-2-pyrrolidone. Examples of the oil based solvent may include paraffin, mineral oil, castor oil, tetralin, glycerin, and ethylene glycol. Examples of the anion based surfactant may include lithium alkylsulfate, lithium salt of fatty acid, lithium sterate, lithium polyacrylate, and styrene-lithium maleate anhydride copolymer.

(3) Solvent

The slurry in the present disclosure includes a first solvent and a second solvent as the solvent. The total proportion of the first solvent and the second solvent to all the solvents in the slurry is, for example, 70 weight % or more, may be 80 weight % or more, may be 90 weight % or more, and may be 100 weight %.

Also, the boiling point of the second solvent is higher than the first solvent, and is a solvent left remained in, for example, the later described solid electrolyte-containing layer in a positive manner. When the solid content of the slurry is regarded as 100 weight parts, the proportion of the second solvent is, for example, 0.05 weight parts or more, may be 0.1 weight parts or more, and may be 0.3 weight parts or more. Meanwhile the proportion of the second solvent is, for example, 8 weight parts or less, may be 6 weight parts or less, and may be 4 weight parts or less.

Also, the proportion of the second solvent to the total of the first solvent and the second solvent in the slurry is, for example, 30 weight % or less, may be 15 weight % or less, and may be 5 weight % or less. Meanwhile, the proportion of the second solvent is, for example, 0.1 weight % or more.

The solvent in the present disclosure may or may not include a lithium salt. Examples of the lithium salt may include inorganic lithium salts such as $LiPF_6$, $LiBF_4$, $LiClO_4$, $LiAsF_6$, and $LiSbF_6$; and organic lithium salts such as $LiCF_3SO_3$, $LiC_4F_9SO_3$, $Li[N(FSO_2)_2]$, $Li[N(CF_3SO_2)_2]$, and $Li[C(CF_3SO_2)_3]$. The concentration of the lithium salt in the solvent is, for example, 0.5 mol/l or more and 2 mol/l or less.

In the slurry, the solvent and the sulfide solid electrolyte do not usually react with each other. "The solvent and the sulfide solid electrolyte do not react with each other" means that, when the following two states are compared, the decreasing rate of the ion conductivity of the sulfide solid electrolyte is 10% or less; a state before the sulfide solid electrolyte is immersed in the solvent, and a state after the sulfide solid electrolyte is immersed in the solvent for 1 hour and then dried. The decreasing rate of the ion conductivity of the sulfide solid electrolyte may be 5% or less, may be 3% or less, and may be 1% or less.

2. Sulfide Solid Electrolyte

The sulfide solid electrolyte in the present disclosure is a material including sulfur (S) and having ion conductivity. The crystallization temperature of the sulfide solid electrolyte is, for example, 160° C. or more, may be 170° C. or more, and may be 180° C. or more. Meanwhile the crystallization temperature of the sulfide solid electrolyte is, for example, 240° C. or less, may be 230° C. or less, may be 220° C. or less, and may be 210° C. or less. The crystallization temperature may be determined by a differential thermal analysis (DTA).

In embodiments, the sulfide solid electrolyte may contain Li, A (A is at least one kind of P, Si, Ge, Al, and B) and S. Among them, the sulfide solid electrolyte may include an anion structure of an ortho composition ($PS_4^{3-}$ structure, $SiS_4^{4-}$ structure, $GeS_4^{4-}$ structure, $AlS_3^{3-}$ structure, and $BS_3^{3-}$ structure) as the main component of the anion. In embodiments, the proportion of the anion structure of an ortho composition with respect to all the anion structures in the sulfide solid electrolyte may be 70 mol % or more, or even 90 mol % or more. The proportion of the anion structure of an ortho composition may be determined by methods such as a Raman spectroscopy, NMR, and XPS. Further, the sulfide solid electrolyte may further include X (X is at least one of I, Br and Cl). Also, in the sulfide solid electrolyte, a part of S may be substituted by O.

The sulfide solid electrolyte may be a sulfide glass, and may be a sulfide glass ceramic obtained by heat treating the sulfide glass. The sulfide glass may be obtained by amorphizing a raw material composition including raw material such as $Li_2S$ and $P_2S_5$, for example. Examples of a method for amorphizing may include mechanical milling and a melt-quenching method. The reason therefor is to enable the treatment at ambient temperature so as to facilitate simplification of the manufacturing process. The mechanical milling is not particularly limited as long as it is a method mixing the raw material composition while applying mechanical energy, and examples may include a ball milling, a turbo milling, a mechano-fusion, and a disk milling.

Meanwhile, the sulfide glass ceramic may be obtained by, for example, heat treating the sulfide glass at a temperature of the crystallization temperature or more. That is, the sulfide glass ceramic may be obtained by amorphizing the raw material composition, and further, heat treating. Incidentally, when the sulfide solid electrolyte is the sulfide glass ceramic, the crystallization temperature of the sulfide solid electrolyte means the temperature at which the sulfide glass is crystallized.

3. Slurry

The slurry in the present disclosure includes a sulfide solid electrolyte and a solvent. Also, in embodiments, the slurry in the present disclosure may be used to produce a cathode active material layer, a solid electrolyte layer or an anode active material layer in an all solid state battery. Therefore, in embodiments, the slurry in the present disclosure may further include materials such as an active material, a conductive material, and a binder, in accordance with the intended layer. These materials are described later.

The solid content concentration of the slurry is not particularly limited, and is, for example, 30 weight % or more, may be 40 weight % or more, and may be 50 weight % or more. When the solid content concentration of the slurry is too low, the solvent amount is relatively high so that the productivity tends to be decreased. Meanwhile, when the solid content concentration of the slurry is, for example, 90 weight % or less. When the solid content concentration of the slurry is too high, the viscosity is relatively high so that the coating property tends to be decreased.

Examples of the method for producing the slurry in the present disclosure may include a method wherein the first solvent, the second solvent, and the sulfide solid electrolyte are mixed and kneaded. Examples of the mixing and kneading method may include a method using common mixing and kneading devices, such as a dissolver, a homo mixer, a kneader, a roll mill, a sand mill, an attritor, a ball mill, a vibrator mill, a high speed impeller mill, an ultrasonic homogenizer, and a shaker.

The present disclosure may also provide a slurry comprising a sulfide solid electrolyte and a solvent, and the solvent includes a first solvent and a second solvent, a boiling point of the first solvent is 80° C. or more and less than 200° C., and the first solvent is acyclic ether based solvent, acyclic ester based solvent, or acyclic ketone based solvent, and a boiling point of the second solvent 200° C. or more. That is, "a solvent with boiling point of 80° C. or more and less than 200° C." may be used as the first solvent instead of "a solvent with boiling point of 80° C. or more and less than the crystallization temperature of the sulfide solid electrolyte". Similarly, "a solvent with boiling point of 200° C. or more" may be used as the second solvent instead of "a solvent with boiling point of the crystallization temperature of the sulfide solid electrolyte or more". These points are similar for the later described all solid state battery and the method for producing the same, not only for the slurry. Also, the details for the first solvent and the second solvent are described above.

B. All Solid State Battery

Figure 1:
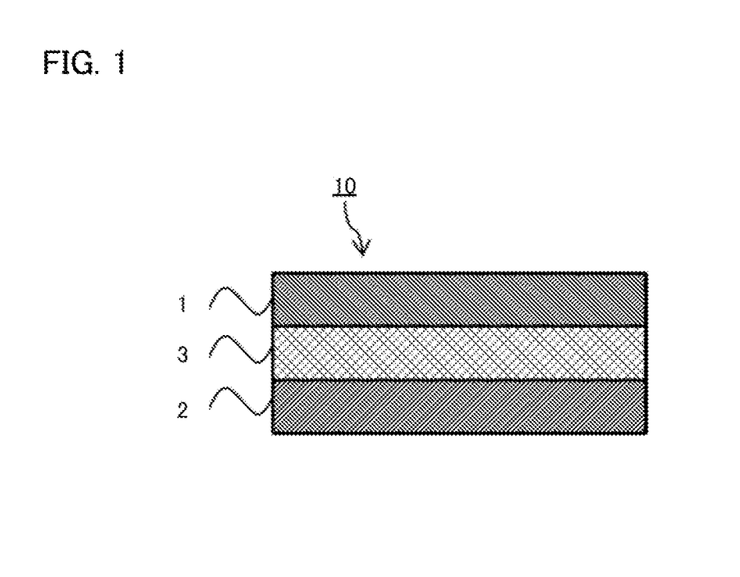
FIG. 1 is a schematic cross-sectional view illustrating an example of an all solid state battery in the present disclosure.

FIG. 1 is a schematic cross-sectional view illustrating an example of an all solid state battery in the present disclosure. As shown in FIG. 1, all solid state battery 10 comprises cathode active material layer 1, anode active material layer 2, and solid electrolyte layer 3 formed between cathode active material layer 1 and anode active material layer 2. An ion is conducted between cathode active material layer 1 and anode active material layer 2 via solid electrolyte layer 3.

In all solid state battery 10, at least one layer of cathode active material layer 1, anode active material layer 2 and solid electrolyte layer 3 is a solid electrolyte-containing layer including a sulfide solid electrolyte. This solid electrolyte-containing layer includes a first solvent and a second solvent as solvents. Further, the content proportion of the first solvent in the solid electrolyte-containing layer is usually 0.01 weight % or more.

According to the present disclosure, since the solid electrolyte-containing layer incudes a predetermined amount of a specific solvent, an all solid state battery with low ion resistivity may be obtained.

1. Solid Electrolyte-Containing Layer

The solid electrolyte-containing layer includes a sulfide solid electrolyte. Further, the solid electrolyte-containing layer includes a first solvent and a second solvent as solvents. The details for the sulfide solid electrolyte, the first solvent, and the second solvent may be in the same contents as those described in "A. Slurry" above; thus, the descriptions herein are omitted. Also, the solid electrolyte-containing layer may be prepared by using the above described slurry.

The content proportion of the first solvent in the solid electrolyte-containing layer is usually 0.01 weight % or more, may be 0.05 weight % or more, may be 0.1 weight % or more, and may be 0.2 weight % or more. Meanwhile, the content proportion of the first solvent in the solid electrolyte-containing layer is, for example, 5 weight % or less, may be 3 weight % or less, and may be 1 weight % or less.

The content proportion of the second solvent in the solid electrolyte-containing layer may be less than the content proportion of the first solvent, may be same as the content proportion of the first solvent, and may be more than the content proportion of the first solvent. The content proportion of the second solvent in the solid electrolyte-containing layer is, for example, 0.05 weight % or more, may be 0.1 weight % or more, and may be 0.3 weight % or more. Meanwhile, the content proportion of the second solvent in the solid electrolyte-containing layer is, for example, 8 weight % or less, may be 6 weight % or less, and may be 4 weight % or less.

The total proportion of the first solvent and the second solvent to all the solvent in the solid electrolyte-containing layer is, for example, 70 weight % or more, may be 80 weight % or more, may be 90 weight % or more, and may be 100 weight %.

The content proportion of the solvents (all solvent) in the solid electrolyte-containing layer is, for example, 0.05 weight % or more, may be 0.15 weight % or more, and may be 0.25 weight % or more. When the content proportion of the solvents is too low, the ion resistivity reducing effect may not be obtained. Meanwhile, the content proportion of the solvents (all solvent) in the solid electrolyte-containing layer is, for example, 10 weight % or less, may be 8 weight % or less, may be 6 weight % or less, may be 4.2 weight % or less and may be 3.1 weight % or less. When the content proportion of the solvents is too high, there is a possibility that the ion conductive inhibiting effect due to the solvents is larger than the ion resistivity reducing effect due to the solvents.

The filling rate of the solid electrolyte-containing layer is, for example, 96% or more, may be 97% or more, and may be 98% or more. The filling rate may be determined by the following method. First, the apparent density of the solid electrolyte-containing layer is calculated from area, thickness and mass of the solid electrolyte-containing layer (apparent density of a solid electrolyte-containing layer=mass/(thickness×area)). Next, the true density of the solid electrolyte-containing layer is calculated from the true density and content of the constituting components of the solid electrolyte-containing layer (true density of a solid electrolyte-containing layer=mass/Z (content of each constituting component/true density of each constituting component)). The proportion of the apparent density to the true density is regarded as filling rate (%).

The solid electrolyte-containing layer at least include the sulfide solid electrolyte and the solvent. Also, when the solid electrolyte-containing layer is an electrode layer, the solid electrolyte-containing layer includes an active material. The active material and other materials will be described later.

2. Cathode Active Material Layer

The cathode active material layer includes at least a cathode active material, and may further include at least one of a solid electrolyte, a conductive material and a binder as an optional component. Also, the cathode active material layer in the present disclosure may or may not be the above described solid electrolyte-containing layer.

Examples of the cathode active material may include an oxide active material. Examples of the oxide active material may include rock salt bed type active materials such as $LiCoO_2$, $LiMnO_2$, $LiNiO_2$, $LiVO_2$, $LiNi_{1/3}Co_{1/3}Mn_{1/3}O_2$; spinel type active materials such as $LiMn_2O_4$, and $LiNi_{0.5}Mn_{1.5}O_4$; and olivine type active materials such as $LiFePO_4$, and $LiMnPO_4$. Examples of the shape of the cathode active material may include a granular shape. The cathode active material may be coated with a lithium ion conductive oxide such as $LiNbO_3$.

Examples of the solid electrolyte may include the above described sulfide solid electrolyte. Also, examples of the conductive material may include a carbon material and a metal material. Examples of the carbon material may include particulate carbon materials such as acetylene black (AB) and Ketjen black (KB); fibrous carbon materials such as VGCF, carbon nanotube (CNT), and carbon nanofiber (CNF). Examples of the metal material may include Ni, Cu, Fe, and SUS. In embodiments, the metal material may be a granular shape or a fibrous shape.

Examples of the binder may include rubber based binders such as butadiene rubber, hydrogenated butadiene rubber, styrene-butadiene rubber (SBR), hydrogenated styrene-butadiene rubber, nitrile butadiene rubber, hydrogenated nitrile butadiene rubber, and ethylene-propylene rubber; fluorine based binders such as polyvinylidene fluoride (PVDF), polyvinylidene fluoride-polyhexafluoropropylene copolymer (PVDF-HFP), polytetrafluoroethylene, and fluororubber; polyolefin based thermoplastic resins such as polyethylene, polypropylene, and polystyrene; and imide based resins such as polyimide, and polyamidimide; amide based resins such as polyamide; acryl based resins such as polymethyl acrylate and polyethyl acrylate; and methacryl based resins such as polymethyl methacrylate and polyethyl methacrylate.

3. Anode Active Material Layer

The anode active material layer includes at least an anode active material, and may further include at least one kind of a solid electrolyte, a conductive material and a binder as an optional component. Also, the anode active material layer in the present disclosure may or may not be the above described solid electrolyte-containing layer.

Examples of the anode active material may include a metal active material, a carbon active material, and an oxide active material. Examples of the metal active material may include a metal simple substance such as Si, Sn, In, and Al, and an alloy including at least one kind of these. Examples of the carbon active material may include mesocarbon microbead (MCMB), highly oriented pyrolytic graphite (HOPG), hard carbon, and soft carbon. Examples of the oxide active material may include $Nb_2O_5$, $Li_4Ti_5O_{12}$, and SiO. Examples of the shape of the anode active material may include a granular shape. For the solid electrolyte, the conductive material, and the binder, similar materials described in "2. Cathode active material layer" above may be used; thus, the descriptions herein are omitted.

4. Solid Electrolyte Layer

The solid electrolyte layer is a layer formed between the cathode active material layer and the anode active material layer. The solid electrolyte layer includes at least a solid electrolyte, and may further include a binder as an optional component. Also, the solid electrolyte layer in the present disclosure may or may not be the above described solid electrolyte-containing layer. For the solid electrolyte and the binder, similar materials described in "2. Cathode active material layer" above may be used; thus, the descriptions herein are omitted.

5. All Solid State Battery

In embodiments, the all solid state battery in the present disclosure may include an anode current collector and a cathode current collector, in addition to the cathode active material layer, the solid electrolyte layer, and the anode active material layer. Examples of the materials for the anode current collector may include SUS, Cu, Ni, Fe, Ti, Co, and Zn. Meanwhile, examples of the materials for the cathode current collector may include Cr, Au, Pt, Al, Fe, Ti, and Zn. Also, the all solid state battery may include an arbitrary battery case such as a battery case made from SUS, for example.

In embodiments, the all solid state battery in the present disclosure may be an all solid state lithium ion battery. Also, the all solid state battery may be a primary battery, and may be a secondary battery. In embodiments, the all solid state battery in the present disclosure may be the secondary battery, so as to be repeatedly charged and discharged, and is useful as, for example, a car-mounted battery. Examples of the shape of the all solid state battery may include a coin shape, a laminate shape, a cylindrical shape, and a square shape.

Further, the present disclosure may also provide a solid electrolyte-containing layer used for an all solid state battery, the solid electrolyte-containing layer including a sulfide solid electrolyte and a solvent, the solvent includes a first solvent and a second solvent, a boiling point of the first solvent is 80° C. or more and less than a crystallization temperature of the sulfide solid electrolyte, the first solvent is acyclic ether based solvent, acyclic ester based solvent, or acyclic ketone based solvent, a boiling point of the second solvent is a crystallization temperature of the sulfide solid electrolyte or more, and a content proportion of the first solvent in the solid electrolyte-containing layer is 0.01 weight % or more.

C. Method for Producing all Solid State Battery

The method for producing an all solid state battery in the present disclosure comprises a coating step of forming a coating layer by coating a substrate with the above described slurry, a drying step of forming a dried coating layer by drying the coating layer, and a pressing step of forming a solid electrolyte-containing layer by pressing the dried coating layer, and a drying condition in the drying step is adjusted so as a content proportion of the first solvent in the solid electrolyte-containing layer is 0.01 weight % or more.

According to the present disclosure, by adjusting the drying condition in the drying step so as the solid electrolyte-containing layer includes a predetermined amount of a specific solvent, an all solid state battery with low ion resistivity may be obtained.

Figure 2:
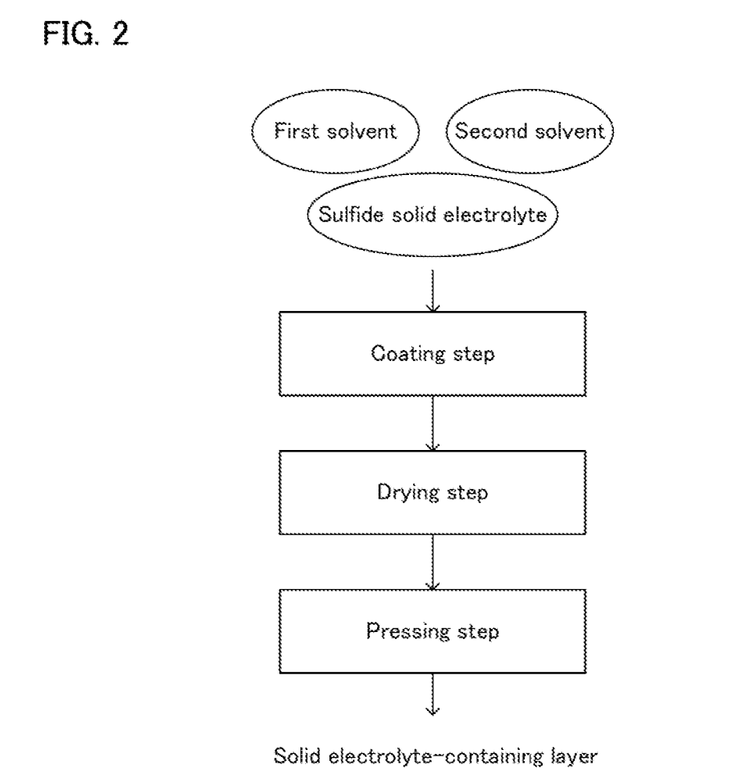
FIG. 2 is a flow chart illustrating an example of a part of the method for producing an all solid state battery in the present disclosure.

FIG. 2 is a flowchart illustrating a part of a method for producing an all solid state battery in the present disclosure.

First, in FIG. 2, a sulfide solid electrolyte, a first solvent, and a second solvent are prepared, and a slurry is prepared by mixing and kneading these. Next, a substrate is coated with the obtained slurry to form a coating layer (coating step). Then, the obtained coating layer is dried to form a dried coating layer (drying step). Then, the obtained dried coating layer is pressed to form a solid electrolyte-containing layer (pressing step). By adjusting the drying condition in the drying step so as a content proportion of the first solvent in the solid electrolyte-containing layer is 0.01 weight % or more, a solid electrolyte-containing layer with low ion resistivity may be obtained, and as the result, an all solid state battery with low ion resistivity may be obtained.

1. Coating Step

The coating step in the present disclosure is a step of forming a coating layer by coating a substrate with the above described slurry. The slurry may be in the same contents as those described in "A. Slurry" above; thus, the descriptions herein are omitted.

The substrate is not particularly limited, and may be appropriately selected according to the kind of the solid electrolyte-containing layer. For example, when the solid electrolyte-containing layer is a cathode active material layer, a cathode current collector or a solid electrolyte layer, for example, may be used as the substrate. Similarly, when the solid electrolyte-containing layer is an anode active material layer, an anode current collector or a solid electrolyte layer, for example, may be used as the substrate. Meanwhile, when the solid electrolyte-containing layer is a solid electrolyte layer, a cathode active material layer or an anode active material layer, for example, may be used as the substrate. Also, regardless of the kind of the solid electrolyte-containing layer, the slurry may be coated on a peelable substrate. Examples of the peelable substrate may include a metal sheet, and a resin sheet such as a fluorine based resin sheet.

Examples of a method for coating the slurry may include methods commonly used in the art, such as a doctor blade method, a die coating method, a gravure coating method, a spray coating method, an electrostatic coating method and a bar coating method.

2. Drying Step

The drying step in the present disclosure is a step of forming a dried coating layer by drying the coating layer. Further, in the present disclosure, the drying condition in the drying step is adjusted so as a content proportion of the first solvent in the solid electrolyte-containing layer is 0.01 weight % or more.

The drying temperature is not particularly limited, and, in embodiments, may be a temperature less than the crystallization temperature of the sulfide solid electrolyte contained in the coating layer. The reason therefor is to prevent the deterioration of the sulfide solid electrolyte. The heating temperature may be the temperature lower than the crystallization temperature of the sulfide solid electrolyte by 5° C. or more, and may be the temperature lower by 10° C. or more. The drying temperature is, for example, 60° C. or more, may be 80° C. or more, and may be 100° C. or more. Meanwhile, the drying temperature is, for example, 190° C. or less, may be 170° C. or less, and may be 160° C. or less.

Examples of the method for drying the coating layer may include general methods such as warm-air/hot-blast drying, infrared ray drying, reduced-pressure drying, and dielectric heat drying. Examples of the drying atmosphere may include inert gas atmospheres such as an Ar gas atmosphere and a nitrogen gas atmosphere. Also, the drying may be carried out under an atmospheric pressure, and may be under a reduced pressure.

Also, the drying condition in the drying step is adjusted so as a content proportion of the first solvent in the solid electrolyte-containing layer after the pressing step is 0.01 weight % or more. In the drying step, the drying conditions may be adjusted so as to obtain the solid electrolyte-containing layer described in "B. All solid state battery" above.

3. Pressing Step

The pressing step in the present disclosure is a step of forming a solid electrolyte-containing layer by pressing the dried coating layer.

Examples of the method for pressing the dried coating layer may include a roll press and a plate press. The linear pressure applied at the time of the roll press is, for example, 1.5 t/cm or more, and may be 2 t/cm or more. Meanwhile, the linear pressure at the time of the roll press is, for example, 10 t/cm or less.

Also, the surface pressure applied at the time of the plate press is, for example, 800 MPa or more, may be 1000 MPa or more, and may be 1200 MPa or more. Meanwhile, the surface pressure applied at the time of the plate press is, for example, 3000 MPa or less.

The pressing time is not particularly limited. Also, in the pressing step, the dried coating layer may be heated simultaneously with the pressing.

4. Others

In the method for producing an all solid state battery in the present disclosure, the solid electrolyte-containing layer may be obtained by each above described step. That is, the method for producing an all solid state battery includes a solid electrolyte-containing layer forming step containing each above described step.

Meanwhile, the method for producing an all solid state battery usually comprise a cathode active material layer forming step of forming a cathode active material layer, a solid electrolyte layer forming step of forming a solid electrolyte layer, and an anode active material layer forming step of forming an anode active material layer. That is, in the method for producing an all solid state battery in the present disclosure, at least one of the cathode active material layer forming step, the solid electrolyte layer forming step, and the anode active material layer forming step is the solid electrolyte-containing layer forming step.

Also, the all solid state battery obtained by each above described step may be in the same contents as those described in "B. All solid state battery" above; thus, the descriptions herein are omitted.

Further, the present disclosure may also provide a method for producing a solid electrolyte-containing layer used for an all solid state battery, the method comprising: a coating step of forming a coating layer by coating a substrate with the above described slurry, a drying step of forming a dried coating layer by drying the coating layer, and a pressing step of forming the solid electrolyte-containing layer by pressing the dried coating layer, and a drying condition in the drying step is adjusted so as a content proportion of the first solvent in the solid electrolyte-containing layer is 0.01 weight % or more.

Further, the present disclosure may also provide a method for producing a solid electrolyte-containing layer used for an all solid state battery, the method comprising: a filling step of forming a second layer by filling a solvent including at least one of a first solvent and a second solvent, onto a first layer including a sulfide solid electrolyte, and a pressing step of forming the solid electrolyte-containing layer by pressing the second layer, and a content proportion of the solvent in the solid electrolyte-containing layer is adjusted so as to be 0.01 weight % or more.

EXAMPLES

Example 1

<Production of Cathode Active Material Layer>

$LiNi_{1/3}Mn_{1/3}Co_{1/3}O_2$ (manufactured by Nichia Corporation) as a cathode active material and $LiI-Li_2O-Li_2S-P_2S_5$ as a sulfide solid electrolyte were weighed and mixed so as to be cathode active material:sulfide solid electrolyte=75:25 in the weight ratio. To 93.5 weight parts of the obtained mixture, a PVDF binder solution was added so as the solid content of the solution was 3.0 weight parts, and 3.0 weight parts of VGCF (a conductive material, manufactured by Showa Denko K. K.) and an ethylcellulose solution (thickening agent, manufactured by Nacalai Tesque, Inc.) were added so as the solid content of the solution was 0.2 weight parts. Further, as the second solvent, 0.3 weight parts of acetophenone was added, thereby obtained a composition of total of 100 weight parts. A cathode slurry was prepared by adding 66.7 weight parts of methyl isobutyl ketone (dehydrated product) as the first solvent to the obtained composition, and carrying out an ultrasonic treatment for 60 seconds with an ultrasonic homogenizer (UH-50, manufactured by SMT Co., Ltd.). A cathode current collector (an Al foil) was coated with this cathode slurry using a baker applicator, dried naturally for 5 minutes, and dried by hot air at 100° C. Thereby, a cathode including a cathode current collector and a cathode active material layer was obtained.

<Production of Anode Active Material Layer>

Natural graphite as an anode active material and $LiI-Li_2O-Li_2S-P_2S_5$ as a sulfide solid electrolyte were weighed and mixed so as to be anode active material:sulfide solid electrolyte=60:40 in the weight ratio. To 96.5 weight parts of the obtained mixture, a PVDF binder solution was added so as the solid content of the solution was 3.0 weight parts and an ethylcellulose solution (thickening agent, manufactured by Nacalai Tesque, Inc.) was added so as the solid content of the solution was 0.2 weight parts. Further, as the second solvent, 0.3 weight parts of acetophenone was added, thereby obtained a composition of total of 100 weight parts. An anode slurry was prepared by adding 80 weight parts of methyl isobutyl ketone (dehydrated product) as the first solvent to the obtained composition, and carrying out an ultrasonic treatment for 60 seconds with an ultrasonic homogenizer (UH-50, manufactured by SMT Co., Ltd.). An anode current collector (a SUS foil) was coated with this anode slurry using a baker applicator, dried naturally for 5 minutes, and dried by hot air at 100° C. Thereby, an anode including an anode current collector and an anode active material layer was obtained.

<Production of Solid Electrolyte Layer>

To 96.2 weight parts of a sulfide solid electrolyte $LiI-Li_2O-Li_2S-P_2S_5$, a PVDF binder solution was added so as the solid content of the solution was 3.0 weight parts, and an ethylcellulose solution (thickening agent, manufactured by Nacalai Tesque, Inc.) was added so as the solid content of the solution was 0.5 weight parts. Further, as the second solvent, 0.3 weight parts of acetophenone was added, thereby obtained a composition of total of 100 weight parts. A slurry for a solid electrolyte layer was prepared by adding 122.2 weight parts of methyl isobutyl ketone (dehydrated product) as the first solvent to the obtained composition, and carrying out an ultrasonic treatment for 60 seconds with an ultrasonic homogenizer (UH-50, manufactured by SMT Co., Ltd.). A substrate (an Al foil) was coated with this slurry for a solid electrolyte layer by using a baker applicator, dried naturally for 5 minutes, and dried by hot air at 100° C. Thereby, a substrate and a solid electrolyte layer were obtained.

<Production of all Solid State Battery>

The solid electrolyte layer peeled off from the substrate was inserted into a ceramic mold (cross-sectional area of 1.0 $cm^2$) in an inert gas, the cathode active material layer was placed on one surface, and the anode active material layer was placed on other side surface. The obtained stack was pressed under pressure of 4.3 ton at the scale of a hydraulic press, and confined under 1 MPa. Thereby, an all solid state battery was obtained. All of the cathode active material layer, the solid electrolyte layer, and the anode active material layer of the obtained all solid state battery correspond to the solid electrolyte-containing layer.

Examples 2 to 5

An all solid state battery was obtained in the same manner as in Example 1 except that the proportion of the second solvent (acetophenone) and the treatment time of the hot-air drying were appropriately adjusted in the manufacture of the cathode active material layer, the solid electrolyte layer, and the anode active material layer.

Example 6

An all solid state battery was obtained in the same manner as in Example 1 except that $LiPF_6$ was added as a metal salt to the second solvent, acetophenone, so as the concentration was 1.0 mol/l, in the manufacture of the cathode active material layer, the solid electrolyte layer, and the anode active material layer.

Example 7

An all solid state battery was obtained in the same manner as in Example 1 except that an infrared drying treatment was carried out so as the layer surface was 150° C., instead of the hot-air drying at 100° C., in the manufacture of the cathode active material layer, the solid electrolyte layer, and the anode active material layer.

Example 8

An all solid state battery was obtained in the same manner as in Example 1 except that methyl isobutyl ketone was changed to butyl butyrate, and acetophenone was changed to 3-hydroxy-2,2,4-trimethylpentyl isobutyrate, in the manufacture of the cathode active material layer, the solid electrolyte layer, and the anode active material layer.

Example 9

An all solid state battery was obtained in the same manner as in Example 1 except that methyl isobutyl ketone was changed to diethylene glycol diethyl ether, and acetophenone was changed to triethylene glycol monomethyl ether, in the manufacture of the cathode active material layer, the solid electrolyte layer, and the anode active material layer.

Example 10

An all solid state battery was obtained in the same manner as in Example 1 except that methyl isobutyl ketone was changed to diisobutyl ketone, and acetophenone was changed to decaethylene glycol monomethyl ether, in the manufacture of the cathode active material layer, the solid electrolyte layer, and the anode active material layer.

Example 11

An all solid state battery was obtained in the same manner as in Example 1 except that methyl isobutyl ketone was changed to diisobutyl ketone, and acetophenone was changed to polyethylene glycol monolaurate (10 E. O.), in the manufacture of the cathode active material layer, the solid electrolyte layer, and the anode active material layer.

Comparative Example 1

In the manufacture of the cathode active material layer, the solid electrolyte layer, and the anode active material layer, each of the cathode active material layer, the solid electrolyte layer, and the anode active material layer was manufactured by not using the solvents (methyl isobutyl ketone and acetophenone), but by powder mixing and powder compacting the materials other than the solvents in a mortar for 10 minutes. An all solid state battery was obtained in the same manner as in Example 1 except that these layers were used.

Comparative Example 2

An all solid state battery was obtained in the same manner as in Example 1 except that the second solvent (acetophenone) was not used, and the treatment time of the hot-air drying was appropriately adjusted in the manufacture of the cathode active material layer, the solid electrolyte layer, and the anode active material layer.

Comparative Example 3

An all solid state battery was obtained in the same manner as in Example 1 except that the second solvent (acetophenone) was not used, and methyl isobutyl ketone was changed to tetrahydrofuran in the manufacture of the cathode active material layer, the solid electrolyte layer, and the anode active material layer.

<Measurement of Remaining Solvent Amount>

The remaining solvent amount of the cathode active material layer, the solid electrolyte layer, and the anode active material layer obtained in Examples 1 to 11 and Comparative Examples 1 to 3 was measured with a gas chromatography (GC). As for the measuring method, the measuring of the remaining solvent amount was carried out with a headspace GC. As for the device constitution, a headspace sampler 7697A Type from Agilent Technologies was used for a sampler part, and 7890B GC from Agilent Technologies was used for a GC analyzer part. The measuring conditions are shown below.

(Analyzing Conditions)
Column: DB-Select 624UI
Inlet temperature: 150° C. Carrier gas: helium
FID: 250° C.
MS mode: Scan (m/z: 29-250)

The remaining solvent amount in the cathode active material layer is shown in Table 1. Incidentally, the results of the remaining solvent amount in the solid electrolyte layer and the anode active material layer were similar to that of the cathode active material layer.

<Measurement of Ion Resistivity>

The Li ion conductivity (ambient temperature) measurement was carried out by an AC impedance method to the all solid state batteries obtained in Examples 1 to 11 and Comparative Examples 1 to 3 so as to evaluate the ion resistivity. Solartron (SI1260) from Toyo Corporation was used for measuring, and the measuring conditions for the impedance measurement were; applied voltage of 10 mV, measuring frequency range of 0.01 MHz to 1 MHz at 25° C. (adjusted in a constant temperature bath). Incidentally, a test cell was prepared by the following method. At first, in an environment of 25° C.±4° C., a not yet charged all solid state battery was charged at constant current with current value of 0.1 C until the voltage of a terminal per an all solid state battery reaches the predetermined voltage, and then, the all solid state battery was charged at constant current/constant voltage for one hour, maintaining the voltage at the predetermined voltage. After the initial charge, the all solid state battery was discharged at constant current/constant voltage for 10 hours to 3.0 V at 0.2 C. After that, in an environment of 25° C.±4° C., the all solid state battery was charged at constant current to 4.0 V at current value of 0.2 C. Thereby, a test cell for measuring the Li ion conductivity was prepared. The ion resistivity was determined as the reciprocal of the obtained lithium ion conductivity. The results are shown in Table 1.

<Measurement of Filling Rate>

The cathode active material layer, the solid electrolyte layer, and the anode active material layer obtained in Examples 1 to 11 and Comparative Examples 1 to 3 were subjected to a pressing treatment with a roll pressing device under line pressure of 4 t/m, and the filling rate after pressing was calculated. The results are shown in Table 2.

TABLE 1

| | First solvent | | Second solvent | | Remaining solvent amount (weight %) | | | |
|---|---|---|---|---|---|---|---|---|
| | Kind of solvent | Boiling point (° C.) | Kind of solvent | Boiling point (° C.) | First solvent | Second solvent | Total | Ion resistivity (%) |
| Example 1 | A1 | 116 | B1 | 202 | 0.2 | 0.3 | 0.5 | 4.1 |
| Example 2 | | | | | 0.2 | 0.05 | 0.25 | 5.3 |
| Example 3 | | | | | 0.01 | 0.3 | 0.31 | 4.8 |
| Example 4 | | | | | 0.01 | 2.99 | 3 | 3.4 |
| Example 5 | | | | | 0.2 | 4 | 4.2 | 11.0 |
| Example 6 | | | | | 0.2 | 0.3 | 0.5 | 5.1 |
| Example 7 | | | | | 0.2 | 0.3 | 0.5 | 4.8 |
| Example 8 | A2 | 165 | B2 | 253 | 0.2 | 0.3 | 0.5 | 4.3 |
| Example 9 | A3 | 162 | B3 | 249 | 0.2 | 0.3 | 0.5 | 4.0 |
| Example 10 | A4 | 168 | B4 | >250 | 0.2 | 0.3 | 0.5 | 3.8 |
| Example 11 | | | B5 | >250 | 0.2 | 0.3 | 0.5 | 3.6 |

TABLE 1-continued

|  | First solvent | | Second solvent | | Remaining solvent amount (weight %) | | | Ion resistivity (%) |
|---|---|---|---|---|---|---|---|---|
|  | Kind of solvent | Boiling point (° C.) | Kind of solvent | Boiling point (° C.) | First solvent | Second solvent | Total |  |
| Comp. Ex. 1 | — | — | — | — | — | — | — | 18.1 |
| Comp. Ex. 2 | A1 | 116 | — | — | 0.005 | — | 0.005 | 19.8 |
| Comp. Ex. 3 | C1 | 65 | — | — | 0.2 | — | 0.2 | 25.1 |

A1: methyl isobutyl ketone
A2: butyl butyrate
A3: diethylene glycol diethyl ether
A4: diisobutyl ketone
B1: acetophenone
B2: 3-hydroxy-2,2,4-trimethylpentyl isobutyrate
B3: triethylene glycol monomethyl ether
B4: decaethylene glycol monomethyl ether
B5: polyethylene glycol monolaurate (10 E. O. )
C1: tetrahydrofuran

TABLE 2

|  | First solvent | | Second solvent | | Filling rate (%) | | |
|---|---|---|---|---|---|---|---|
|  | Kind of solvent | Boiling point (° C.) | Kind of solvent | Boiling point (° C.) | Cathode active material layer | Anode active material layer | Solid Electrolyte layer |
| Example 1 | A1 | 116 | B1 | 202 | 97.1 | 97.9 | 96.1 |
| Example 2 |  |  |  |  | 96.0 | 96.6 | 95.0 |
| Example 3 |  |  |  |  | 96.1 | 96.4 | 95.7 |
| Example 4 |  |  |  |  | 99.1 | 99.8 | 98.9 |
| Example 5 |  |  |  |  | — | — | — |
| Example 6 |  |  |  |  | 96.9 | 97.1 | 96.7 |
| Example 7 |  |  |  |  | 96.9 | 96.9 | 96.6 |
| Example 8 | A2 | 165 | B2 | 253 | 97.5 | 97.3 | 96.8 |
| Example 9 | A3 | 162 | B3 | 249 | 98.0 | 98.3 | 97.6 |
| Example 10 | A4 | 168 | B4 | >250 | 98.9 | 99.8 | 98.2 |
| Example 11 |  |  | B5 | >250 | 99.0 | 99.7 | 98.6 |
| Comp. Ex. 1 | — | — | — | — | 88.1 | 88.7 | 87.6 |
| Comp. Ex. 2 | A1 | 116 | — | — | — | — | — |
| Comp. Ex. 3 | C1 | 65 | — | — | 93.8 | 94.7 | 93.4 |

As shown in Table 1, compared to Comparative Example 1 wherein the first solvent and the second solvent were not included, it was able to decrease the ion resistivity in Examples 1 to 11, by the first solvent and the second solvent being included in the solid electrolyte-containing layer including the sulfide solid electrolyte. It is presumed that, since the first solvent and the second solvent were left remained in the all solid state battery, the interface resistance (friction resistance) between the particles included in the electrode layer was decreased during the press so that the sliding property on the particle interface was improved. Specifically, as shown in Table 2, it is presumed that, since the sliding property at particle interface was improved, the filling rate after pressing was improved, and the ion path was formed effectively so that the ion resistivity was decreased.

Also, comparing Example 1 and Example 6, the ion resistivity in Example 1, wherein the metal salt $LiPF_6$ was not added, was lower than the ion resistivity in Example 6, wherein the metal salt $LiPF_6$ was added. The reason is presumed that a part of the sulfide solid electrolyte was deteriorated by the metal salt so that the interface resistance was increased.

Also, when the remaining solvent amount was lower than 0.01 weight % as Comparative Example 2, the ion resistivity was increased. The reason therefor is presumed that, since the remaining solvent amount was low, the solid content was agglutinated so that the improving effect of the sliding property on the particle interface was not obtained. Further, when tetrahydrofuran was used as the first solvent as in Comparative Example 3, the ion resistivity was remarkably increased. The reason therefor is presumed that a cyclic organic solvent such as tetrahydrofuran easily dissolves and deteriorates the sulfide solid electrolyte. Also, the reason therefor is presumed that tetrahydrofuran formed a peroxide with an oxygen in the air.

REFERENCE SIGNS LIST

1 . . . cathode active material layer
2 . . . anode active material layer
3 . . . solid electrolyte layer
10 . . . all solid state battery

What is claimed is:

1. A method for producing an all solid state battery, the method comprising:
   a coating step of forming a coating layer by coating a substrate with a slurry, the slurry comprising a sulfide solid electrolyte and a solvent, wherein:
   the solvent includes a first solvent and a second solvent;
   a boiling point of the first solvent is 80° C. or more and less than a crystallization temperature of the sulfide solid electrolyte;
   the first solvent is acyclic ether based solvent, acyclic ester based solvent, or acyclic ketone based solvent; and a boiling point of the second solvent is the crystallization temperature of the sulfide solid electrolyte or more;
a drying step of forming a dried coating layer by drying the coating layer; and
a pressing step of forming a solid electrolyte-containing layer by pressing the dried coating layer;
wherein a drying condition in the drying step is adjusted so a content proportion of the first solvent in the solid electrolyte-containing layer is 0.01 weight % or more.

* * * * *